O. J. AND C. BLAKE.
PNEUMATIC TOOL.
APPLICATION FILED MAR. 3, 1917.
1,334,433.
Patented Mar. 23, 1920.
2 SHEETS—SHEET 1.
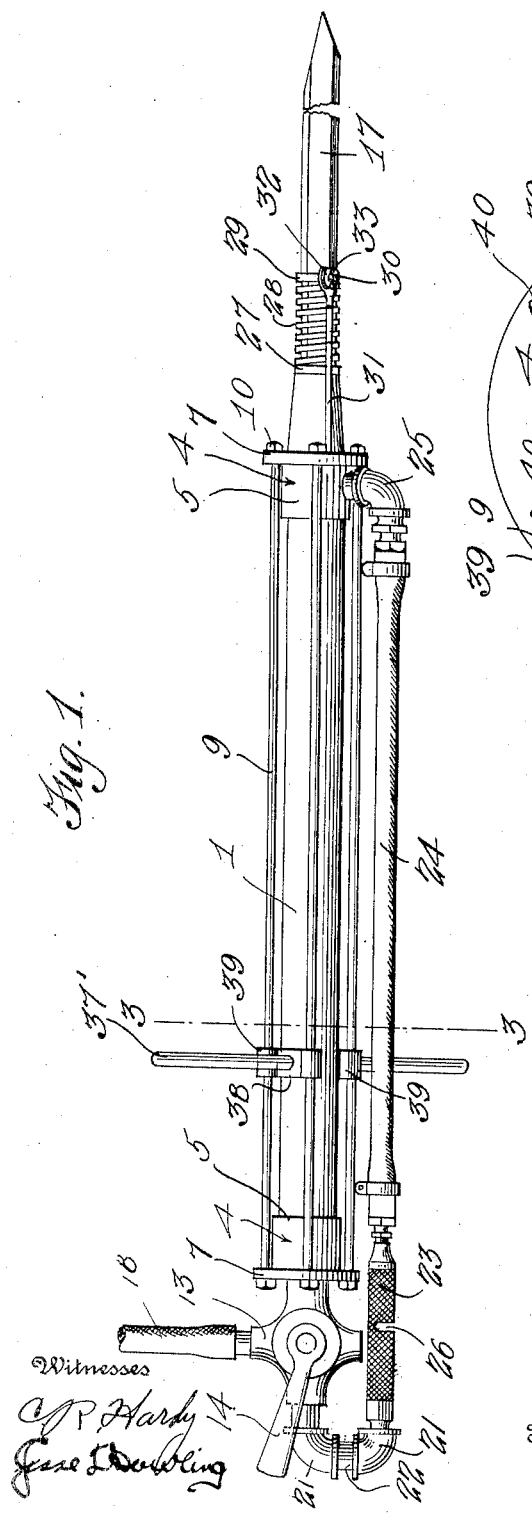
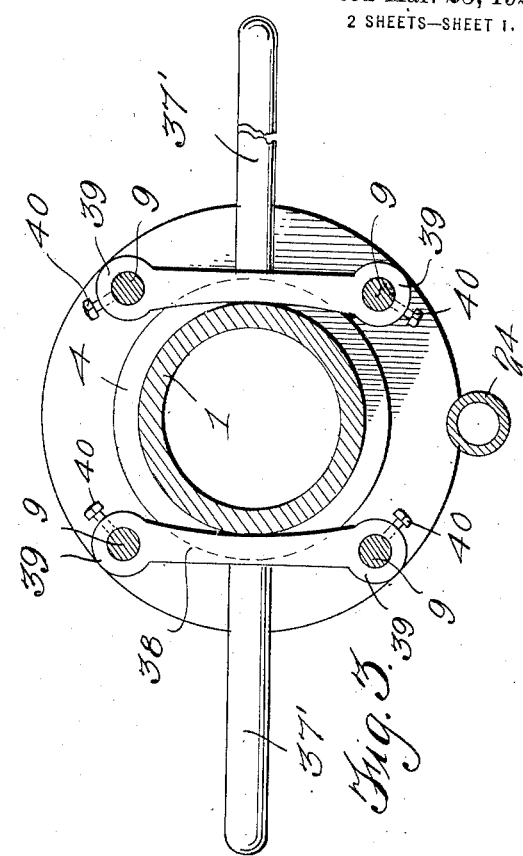
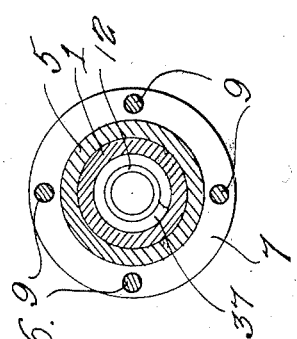
Inventor
OSCAR J. BLAKE
CLYDE BLAKE O. J. AND C. BLAKE.
PNEUMATIC TOOL.
APPLICATION FILED MAR. 3, 1917.
1,334,433.
Patented Mar. 23, 1920.
2 SHEETS—SHEET 2.
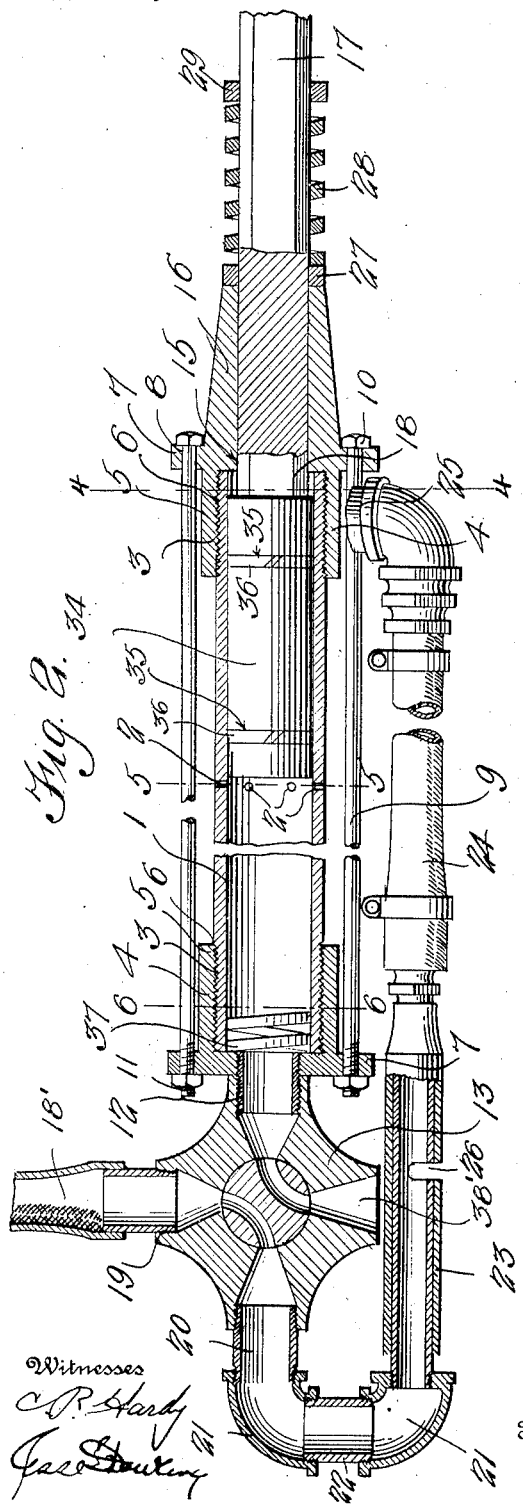
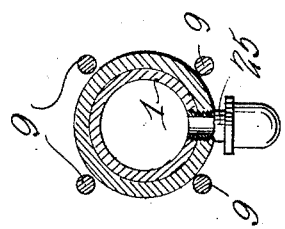
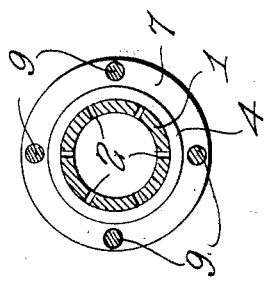
Inventor
OSCAR J. BLAKE
CLYDE BLAKE

UNITED STATES PATENT OFFICE.

OSCAR J. BLAKE AND CLYDE BLAKE, OF HUNTINGTON, WEST VIRGINIA.

PNEUMATIC TOOL.

1,334,433.      Specification of Letters Patent.      Patented Mar. 23, 1920.

Application filed March 3, 1917. Serial No. 152,319.

*To all whom it may concern:*

Be it known that we, OSCAR J. BLAKE and CLYDE BLAKE, citizens of the United States, residing at Huntington, in the county of Cabell and State of West Virginia, have invented certain new and useful Improvements in Pneumatic Tools; and we do hereby declare the following to be a full, clear, and exact description of the invention, such as will enable others skilled in the art to which it appertains to make and use the same.

This invention relates to improvements in pneumatic tools.

The object of this invention is an important provision of a pneumatic tool which is especially adapted for delivering a single powerful blow at each operation.

Another object of this invention is the provision of a tool of this character, which is especially adapted for ramming and puncturing tools for various purposes, such as for instance, in driving staples out of boilers, riveting, or removing other bolts from their fastenings and also may be used as a drill for rocks and the like, being of such a character that a full force blow may be effective by preventing any recoil to the cylinder.

A further object of this invention is the provision of a tool capable of delivering a single powerful blow, which is adapted to be operated by steam, compressed air or the like, and its operation is controlled by a four way valve.

A still further object of this invention is the provision of a device of this character, which embodies a cylinder having removable heads at each end, a valve carried by one of the heads and a tool loosely carried by the other head, a piston slidably arranged in the cylinder delivering the blow to the tool, and a pipe connecting the valve to the tooled end of the cylinder forcing the piston rearwardly after its impact with the tool.

A still further object of this invention is the provision of a tool of this character, which will be simple, practical, and comparatively inexpensive in construction, and one that can be manufactured and sold at a small cost.

With these and other objects in view, the invention consists of certain novel features of construction, combination and arrangement of parts, as will be hereinafter more fully described and set forth in the claims hereto appended.

In the drawings:

Figure 1 is a plan view of our invention assembled,

Fig. 2 is a longitudinal sectional view of the same,

Fig. 3 is a transverse sectional view taken on the line 3—3 of Fig. 1,

Fig. 4 is a transverse sectional view taken on the line 4—4 of Fig. 2,

Fig. 5 is a transverse sectional view taken on the line 5—5 of Fig. 2,

Fig. 6 is a transverse sectional view taken on the line 6—6 of Fig. 2.

Like numerals of reference designate corresponding parts in all the figures of the drawings.

Referring more particularly to the drawings, the numeral 1 designates a cylinder, which is provided intermediate its ends with a plurality of relatively spaced annularly arranged exhaust openings 2. The opposite ends of the cylinder are provided with exterior screwthreads 3 which are adapted to have removably fitted thereon heads 4. The heads 4 each comprise sleeves 5, which are provided with interior screwthreads 6 for fitting the screwthreads 3 of the cylinder 1 for removably securing the heads 4 to the opposite ends of the cylinder 1. Each of the sleeves 5 of the heads are provided with annular flanges 7, which flanges are provided with spaced openings 8, which are adapted to aline with one another for removably receiving reinforcing and supporting rods 9, secured therein by nuts 10 or other suitable fastening means.

One of the head members 4 constitutes the upper end of the cylinder and the opposite head constitutes the lower end. The head at the left in the Fig. 2 constitutes the upper end of the cylinder 1 and is provided with a screwthreaded concentrically arranged opening 11, which is adapted to receive a short pipe connection 12, removably fitted therein. Removably secured to the outer end of the pipe connection 12 is a four way valve 13, which valve is operated by a suitable handle 14.

The lower head 4 which is removably secured to the other end of the cylinder is provided with an opening 15 and has concentrically arranged around the opening on the outer face thereof, a tapered hollow extension 16, in which is slidably arranged a tool 17. The inner end of the tool extends slightly beyond and into the cylinder 1, as at 18, as shown in Fig. 2.

A supply pipe 18' is removably associated with the four way valve as at 19. The valve has connected thereto a feed pipe 20, which is constructed of elbows and pipe sections 21 and 22. Secured to one of the elbows 21 is a sleeve valve 23, which valve is adapted to be connected to a flexible pipe section 24. The pipe 24 is connected to a pipe section 25, which extends through an opening in the lower head 4 of the cylinder 1, thus establishing a communication between the supply pipe 18, through the four way valve to the lower end of the cylinder 1, the purpose of which will be hereinafter more fully described.

The sleeve valve 23 is provided with an outlet port 26 which is adapted to be open or closed to increase or decrease the pressure to the cylinder 1 as desired.

The tool 17 has shrunk thereon intermediate its ends, a collar 27, which is adapted to abut the outer edge of the extension 16. Surrounding the tool 17, is a coil spring 28, which has one end abutting the collar 27. The opposite end is secured to a collar 29, which is slidably arranged on the tool 17, to force the tool within the cylinder 1 and hold the same flexibly within the head.

The collar 29 is provided at diametrically opposite points with laterally projecting stub shafts 30, which are adapted to have removably secured thereon one end of safety rods 31. The safety rods 31 are provided at one end with circular enlargements 32, which are removably fitted on the shafts 30 of the collar 29 on the opposite sides thereof and have their opposite ends removably extending through the flanges 7 of the lower head 4, thus preventing the tool from being driven entirely from the heads 4 of the cylinder and at the same time acts as a guide for the tool when being used.

The enlargements 32 are arranged over the shafts 30 and are held therein by cotter keys 33, which permits the tool to be easily and quickly removed when the same is to be replaced by a different tool.

Slidably mounted in the cylinder 1, is a piston 34, which is provided adjacent its ends, with annular grooves 35, in which are arranged packing rings 36.

A coil spring 37 is arranged within the upper head 4 in the interior of the cylinder and is adapted to limit the rearward movement of the piston when forced thereback by the fluid pressure after completing its impact with the tool, thus preventing injury to the head or jarring the same when forced thereto.

Adjustably mounted on the bars 9 and secured thereto are supporting handles 37', which handles are provided at one end with attaching plates 38. The plates or arms 38 contact with the cylinder on opposite sides of the same and serve to brace the cylinder. The ends of the plates 38 are provided with sockets 39, adapted to be slidably arranged on the reinforcing rods 9. The sockets 39 are provided with set screws 40, which extend therethrough and engage the bars 9 supporting the attaching plate upon the bars and positioning the handles 37' in various positions upon the bars 9, so as to render the cylinder easy to handle.

It can be readily seen that the pipe 25 making its entrance through the lower head 4 and into the cylinder 1, is located slightly beyond the inner end of the tool 17, so that when air is admitted therein, the forcing of the piston rearwardly will be assured.

In operation, the handle 14 of the four way valve is turned to aline the supply pipe 18 with the pipe 20 thus the pressure is forced down through the pipe 20 and into the cylinder as at 25 against one face of the piston 34, forcing the same rearwardly against the springs 37. The handle 14 is then turned to aline with the valve so as to establish communication between the supply pipe 18 and pipe 12 in the head 4 of the cylinder, thus against the opposite face of the piston 34 driving the same toward the tool 17 and operation is completed, it being understood that the four way valve is provided with an exhaust 38', which permits the air to be exhausted from the cylinder upon a return stroke of the piston.

What is claimed is:

1. A pneumatic tool including a cylinder, a tool having one end extending into the cylinder, a piston arranged within the cylinder and adapted to ram the tool, a valve member having communication with the rear portion of the cylinder, a pipe connected with the valve member and in communication with the forward portion of the cylinder for supplying air under pressure thereto, a sleeve valve disposed in said pipe and including a pair of interfitting sections having registering vents, and a flexible tube arranged between the sleeve valve and the discharge end of the pipe, the vents in the sections of said valve being adapted to control the supply of pressure to the forward portion of the cylinder.

2. A pneumatic tool including a cylinder, heads for the cylinder, pairs of rods connecting the heads, arms contacting with the cylinders on opposite sides of the same and having their end portions provided with openings slidably receiving said rods, locking devices adjustably securing the arms to said rods, handles carried by said arms, a tool carried by one of the heads, and a fluid actuated piston for ramming the tool.

In testimony whereof we affix our signatures in presence of two witnesses.

OSCAR J. BLAKE.
CLYDE BLAKE.

Witnesses:
D. E. RICHARDSON,
TOM DUNFEE.